United States Patent [19]

McDavid et al.

[11] 4,236,234
[45] Nov. 25, 1980

[54] RADIO FREQUENCY SEISMIC GATHERING SYSTEM EMPLOYING AN AIRBORNE BLIMP

[75] Inventors: William T. McDavid, Cypress; James M. McKeever, Rosenberg; Roger A. Imm, Houston, all of Tex.

[73] Assignee: Fairfield Industries, Inc., Houston, Tex.

[21] Appl. No.: 60,625

[22] Filed: Jul. 25, 1979

[51] Int. Cl.³ .............................................. G01V 1/22
[52] U.S. Cl. ........................................ 367/77; 367/14; 343/706; 455/97
[58] Field of Search ............................ 367/77, 76, 14; 181/109, 114; 343/706; 340/189 M; 455/66, 97, 98

[56] References Cited

U.S. PATENT DOCUMENTS

| 465,971 | 12/1891 | Edison | 343/706 |
|---|---|---|---|
| 651,361 | 6/1900 | Kitsee | 455/97 |
| 1,375,675 | 4/1921 | Colpitts | 455/97 |
| 1,492,300 | 4/1924 | Lawy | 367/14 |
| 3,030,500 | 4/1962 | Katzen | 343/706 |
| 3,062,315 | 11/1962 | Herzok | 367/77 |
| 3,514,749 | 5/1976 | Padberg | 181/109 |
| 3,555,502 | 1/1971 | Davis et al. | 367/77 |
| 3,979,753 | 9/1976 | Underwood | 343/706 |
| 4,016,951 | 4/1977 | Dick et al. | 181/109 |

FOREIGN PATENT DOCUMENTS 240327  2/1943  Switzerland .............................. 343/706

OTHER PUBLICATIONS

Fleming, "Skyhooks for Antenna", Jul. 1, 1976, Telephone Engineer & Management, vol. 80, #13, pp. 42-43.

*Primary Examiner*—Nelson Moskowitz
*Attorney, Agent, or Firm*—Frank S. Vaden, III

[57] ABSTRACT

The central station of a radio-connected seismic surveying system uses a tethered blimp carrying an antenna and an electronics package including a dc voltage/rf decoupler, a variable dc controlled preamplifier, a P-I-N diode switch for changing the antenna from receive to transmit operation, a transmitter and modulator and a battery. An rf coaxial cable to ground provides means for controlling the preamplifier gain and for switching the central station to the transmit mode by using appropriate dc signals. In the receive mode, the cable carries detected field unit seismic signals, which are detected by the blimp-carried antenna and preamplified by the blimp preamplifier, to the ground for suitable recording and further processing in the ground portion of the central station. An audio channel can also be modulated onto the transmit carrier of approximately 70 MHz to provide voice communications via the blimp electronics, if desired. Both the ground portion and the blimp portion of the central station are packaged for helicopter transporting.

10 Claims, 3 Drawing Figures

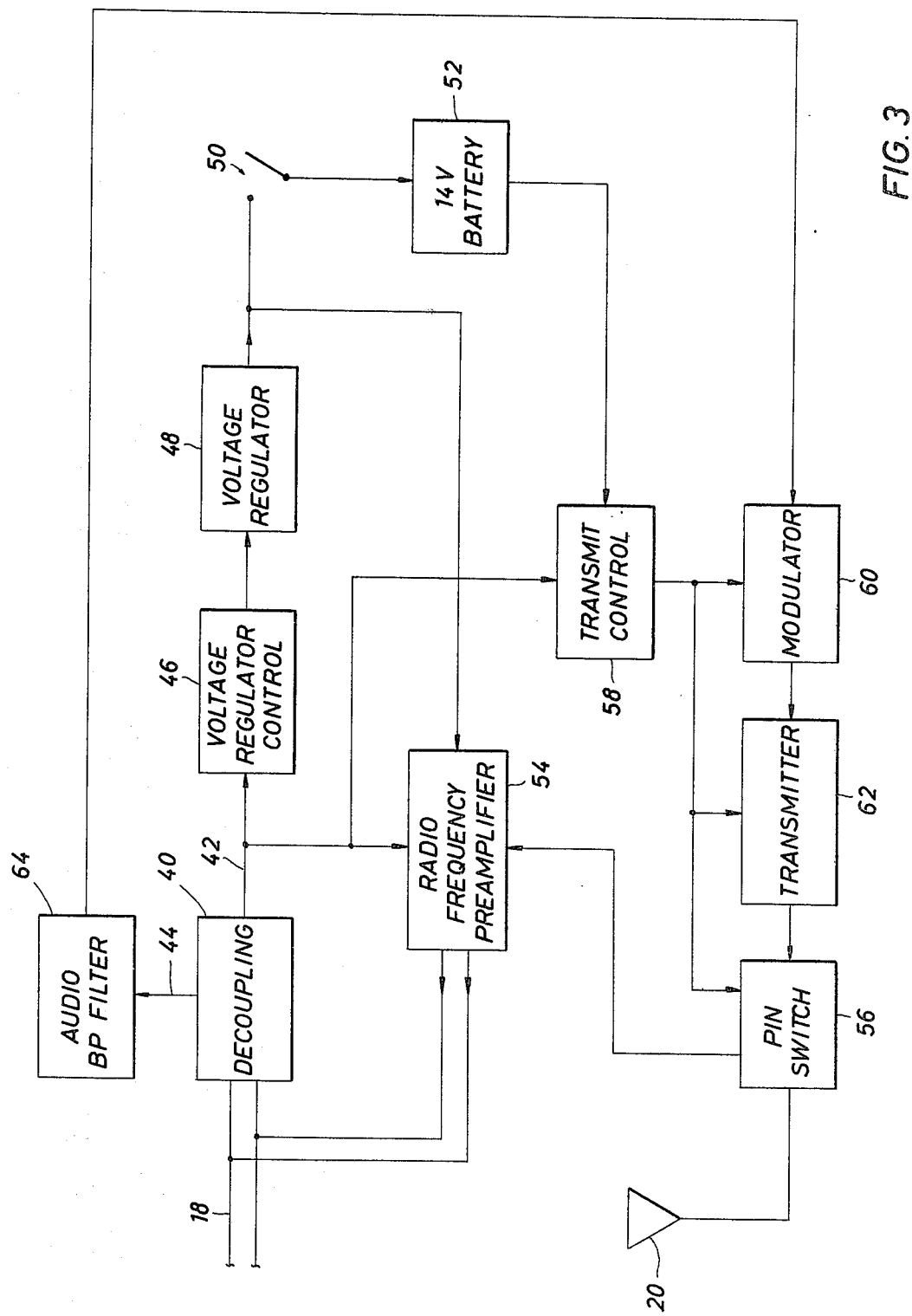

RADIO FREQUENCY SEISMIC GATHERING SYSTEM EMPLOYING AN AIRBORNE BLIMP

BACKGROUND OF THE INVENTION

1. Field of the Invention

This invention pertains to seismic surveying gathering systems and more particularly to such a system employing radio communications between the field data acquisitions units and a central recording station wherein part of the electronics for the central station is carried as an electronic package by a tethered blimp.

2. Description of the Prior Art

The use of radio links for the communication network required between remote or field data acquisition units for detectors and the command or central data gathering and recording station is becoming increasingly popular with the increasingly difficult geographical terrains now being encountered. That is, with the increasing pressure to survey for oil and gas supplies, more and more difficult and remote areas of the world are being explored for this purpose. Conventional cable connections previously employed are becoming increasingly difficult or impractical to use.

The most effective gathering system employing radio communications uses an airborne-installed central station, such as described in patent application Ser. No. 48,393, filed June 14, 1979, and commonly assigned with the present application. The detector arrays which are uniformly located for regular and complete coverage, often locate some individual detectors in ground swells, in swamps, behind hills and otherwise makes line-of-sight radio communications difficult to impossible without the use of an airborne central station. With an airborne central station, however, line-of-sight is assured and the high frequencies that are allocated for use by the FCC can be utilized.

However, it is well known that using an airplane is expensive. Moreover, airplanes are complicated machinery and are subject to maintenance and repair problems that result in sometimes more than occasional down time. Furthermore, operating an airplane can be hazardous and should a plane crash, there would be expected long delays in running a survey as well as the expense of replacing the aircraft and the equipment.

Electronics have been carried by unmanned airborne vehicles in applications where it was advantageous to have a high elevation communications terminal and other electrical components. For example, weather balloons carry instruments for sampling the environment and transmitting certain findings back to a land-based or ground receiver. Such balloons are, of course, not tethered and are not controlled or powered or signalled in any way through the use of cables. Moreover, such balloons are not controlled as to location nor do they operate intimately with an electronics package which is partly ground based and partly air-launched. Furthermore, such a balloon, if tethered, would tend to lie over at an acute angle to the earth in steady winds and would not attain the desirable high altitude and nearly vertical attitude of an aerodynamically shaped blimp.

Balloons have been used to enhance communications, particularly voice communications, in some military applications. Such balloons have carried only the rather long wire antennas that are required when communicating at relatively low frequencies, for example, below 30 MHz. It is not believed that any such balloons have carried appreciable electronics controllable from the ground, nor that they have had components including a small battery to optimize operations while minimizing the effects of power losses both to and from the balloon-carried components. Moreover, no known balloon antenna system has been operable in the 70+ MHz range contemplated for the system described herein.

Therefore, it is a feature of the present invention to provide an improved seismic survey gathering system wherein part of the central station electronics can be airborne without the use of an airplane.

It is another feature of the present invention to provide an improved seismic survey gathering system utilizing a blimp for carrying some of the electronic elements of the central station.

It is still another feature of the present invention to provide an improved seismic survey gathering system whereby the central station thereof is heliportable, and in which part of the central station is launchable via a tethered blimp, thereby providing the advantages of an airplane-installed central station without the disadvantages of high cost of operation and unreliability of airplane availability.

SUMMARY OF THE INVENTION

The seismic gathering system utilizing the present invention includes a central station having a data recording system and transmitters and receivers for communicating with the individually arrayed field detectors. The primary power supply for the central station and the heavy equipment items are housed in a manned instrument room suitably mounted for heliporting. The room also includes a switch control for sending appropriate dc voltages from a variable dc voltage power supply via an rf coaxial cable to the electronics carried by a blimp tethered to the station's instrument room.

The blimp-carried electronics include a decoupler for separating the dc voltages connected via the ground switch control from rf and audio frequencies and applying the dc voltages as a gain control for a suitable preamplifier. A voltage regulator provides a trickle charge to a battery through an electronic switch and provides a reference dc voltage to the preamplifier. Detector signals received by the antenna on the blimp are preamplified and coupled to the instrument room via the rf cable.

A ground potential from the ground switch control operates a transmit control network on the blimp, which, in turn, disconnects the voltage regulator from trickle charging the battery and connects the output of the battery to activate a transmitter and a companion modulator. Outgoing transmissions are coupled to the antenna through a P-I-N diode switch which is switched from the receive mode to the transmit mode by a transmit control network.

Audio communications are also capable of being coupled through the rf cable and the decoupler through a suitable band pass filter to the modulator, if desired.

The blimp is transportable even without being deflated. Winches are used to lower the inflated blimp so that it can be tied to the instrument room, and then covered by an appropriate net or tarpaulin. Thus secured, the entire assembly is then helicopter transportable using a long line connection.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate on a typical embodiment of the invention and are therefore not to be considered limiting of its scope, for the invention may admit to other equally effective embodiments.

IN THE DRAWINGS

Figure 1:
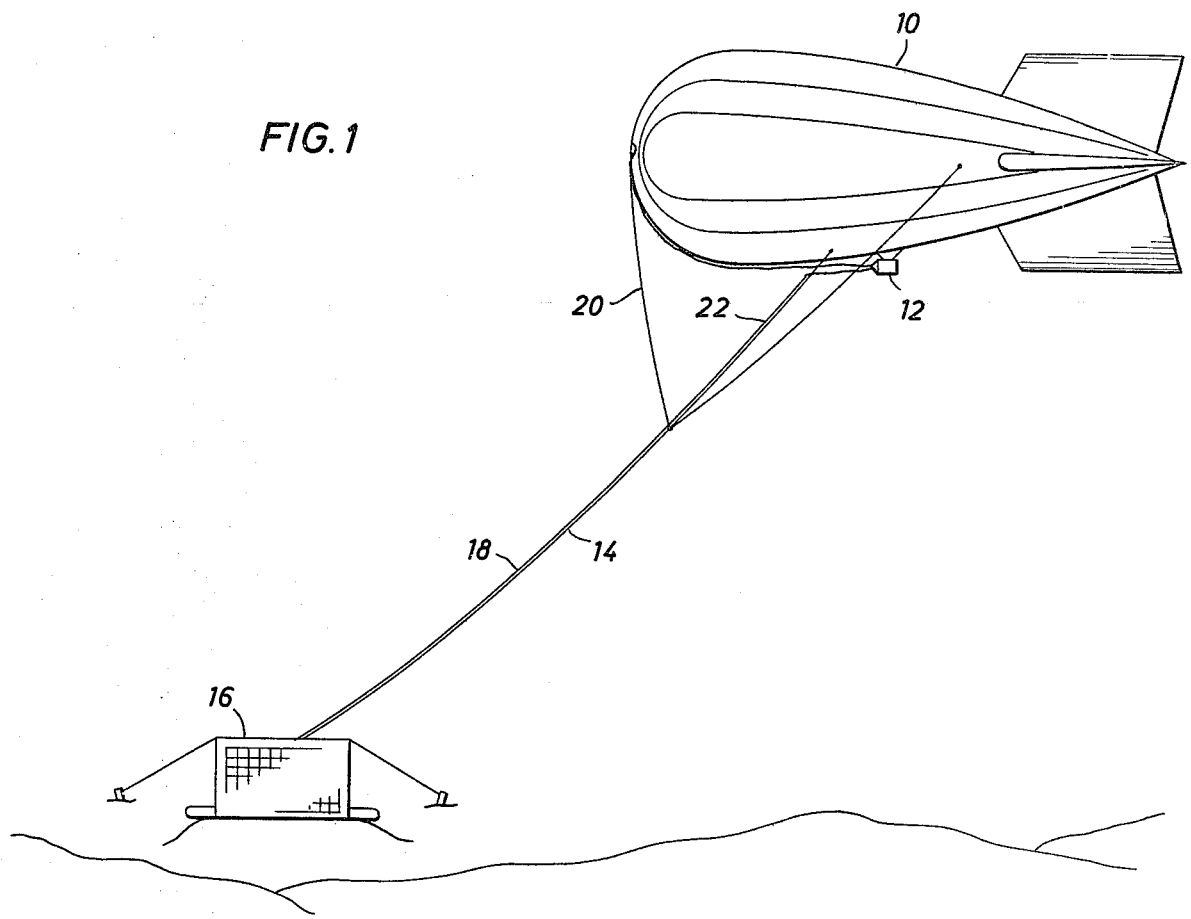

FIG. 1 is a pictorial view of a blimp carrying an electronics package at the central station of a seismic survey gathering system in accordance with the present invention.

Figure 2:
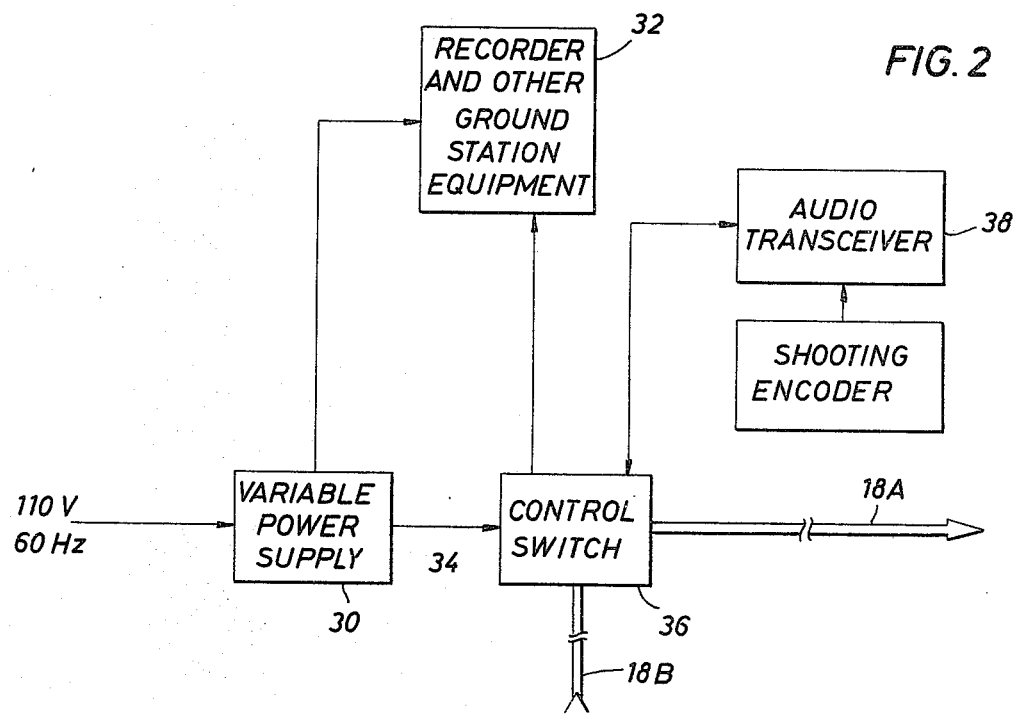

FIG. 2 is a block diagram of the ground control network for operating with the blimp-carried electronics in accordance with a preferred embodiment of the present invention.

FIG. 3 is a block diagram of the blimp-carried electronics in accordance with a preferred embodiment of the present invention.

DESCRIPTION OF THE PREFERRED EMBODIMENT

A seismic gathering system in accordance with the present invention ordinarily employs a plurality of field unit seismic detectors or data acquisition units, each of which includes a receiver for receiving an activation signal and and rf transmitter. When a predetermined signal is received by the receiver at a detector, the transmitter at that detector is activated and transmits seismic data therefrom to a central data gathering station. There the signals from the various detectors are recorded and processed. Also, the central data gathering station includes the control transmission equipment for initiating the predetermined activation signals to the detectors. The central station may also house the equipment for activating the seismic source or sources with which the detectors operate as well as the voice communications equipment for giving direction to the field personnel, both those who are attending the source operation as well as those attending the field unit detectors.

A more complete description of a system comprising the components described above is found in patent application Ser. No. 48,393, filed June 14, 1979, and commonly assigned, which description is incorporated herein by reference for all purposes.

The invention described below is an improvement in the central data gathering station of a seismic data development, transmission and recording system having the general system components as set forth above.

It has been discovered that a central station is advantageously housed in an airborne installation, especially when a rugged terrain is anticipated where there is difficulty in obtaining reliable line-of-sight radio contact between the central station antenna and the antennas of each of the field detectors. However, it should be noted that airborne operations are expensive and are vulnerable to being down for repairs. Hence, a system which relies on an airplane being operable cannot always be dependably utilized.

The central station described herein overcomes the unreliability of airplane-dependency by utilizing a blimp substation or partial station, the blimp being of the kind requiring only a small lifting capacity, for example, on the order of only a few pounds. One successful blimp that has been employed as hereinafter described has a length of approximately 18 feet and a diameter of about 7-½ feet.

Now referring to FIG. 1, there is illustrated a tethered aerodynamically stablized blimp 10 carrying on its underside an electronics package 12 to be explained more fully hereinafter. The blimp is tethered via line 14 to a ground station instrument room 16 or in the near vicinity thereof. An rf coaxial cable 18 connects the instrument room with electronics package 12, the cable conveniently being lashed to the tether line, as shown. An rf cable of 100 feet has about 10 db of attenuation for a signal of about 70 MHz. In addition, such a cable has an inherent dc resistance to applied dc voltage.

Antenna 20, carried conveniently depending from the nose of the blimp, is lashed to one of the depending lines of the tethering structure. Conveniently, the antenna is a coaxial dipole type and is maintained at least approximately vertical. Free swinging is prevented by its being lashed to the tether gear line attached to the nose of the blimp. The antenna is connected to the electronics package via an appropriate antenna lead 22.

In operation, the blimp is tethered with a line 14 that is approximately 200-500 feet long and the instrument room itself is located normally on a high rise of ground with about a 75-foot clearing thereabout for convenience and safety of installation. Although the blimp is free to seek its own position with respect to its mooring point or points according to the wind currents, generally the tether line therefrom will never be less than 40 degrees to the ground and more normally the angle is 75-80 degrees. A steady and brisk wind actually causes the blimp to rise so that the line is nearly vertical because of the aerodynamic properties imparted to the blimp by the fins.

Instrumentation 16 includes typically radio frequency receivers corresponding to the detector transmitters in use, a digital recording system (such as a Texas Instruments DFS V), a shooting communications system for operating with one or more sources, a control switch for transmitting and receiving appropriate signals to the blimp-mounted electronics (as more fully explained below), a drywrite camera for developing a visual chart record, a communications radio transceiver, and a power supply.

In addition, the instrument room is configured to be readily heliportable and will include appropriate bottles or canisters of helium for inflating the blimp, winches for raising and lowering the blimp, electronic spares and a covering net or tarpaulin, which is used for covering and securing the blimp to the instrument room when the helicopter is transporting the combination from one location to the next. The entire assembly is readily transportable from one location to another by a medium sized helicopter.

As shown in FIG. 2, the electronic components in the instrument room include a power supply 30 for operating the recorder and other electronic ground station equipment 32 in the instrument room, the power supply also having a variable dc voltage output 34 connected to control switch 36. Typically the variable voltage output range is between 0 volts and 40 volts for providing gain control to the preamplifier. A communication transceiver 38 is also included in the instrument room and is optionally operable through control switch 36, as hereinafter described, although it can be operated independently of the control switch and, hence, independently of the blimp-carried electronics to be discussed. In addition, a shooting encoder 39 can be connected to audio transceiver 38 for the purpose of transmitting through the audio communication system a tone or series of tones appropriate for activating a shooting box connected for controlling the seismic source or sources operating with the overall seismic system. For purposes hereof, reference to the audio communication system includes such tone network for operating a shooting box. Operation of the control switch in the instrument room can best be understood in connection with the discussion of the electronics package carried by the blimp.

Direct current voltage from blimp control switch 36 in the instrument room is coupled to decoupling circuit 40 (FIG. 3) through radio frequency coaxial cable 18 (18A in FIG. 2). The decoupling circuit passes direct current voltage on line 42, passes audio frequency energy on line 44 and decouples or suppresses radio frequency energy altogether. Direct current voltage 42 is coupled to voltage regulator control circuit 46. Control circuit 46 is set so that it will not pass any voltage below a predetermined level, for example, 16 volts. A voltage equal to or greater than the predetermined level is applied to voltage regulator 48.

voltage regulator 48 is set to be current limited, such as at 250 milliamperes, and to be voltage regulated, such as at 16.8 volts. The output from voltage regulator is connected through electronic switch 50 to trickle charge battery 52, typically a 14-volt battery. The output from the regulator is either zero or constant. If present at all, it is independent of applied surge currents applied to the voltage regulator control.

The output from voltage regulator 48 is also connected to radio frequency preamplifier 54 as the reference voltage. For the above example, the reference voltage setting for preamplifier 54 would be established at 16.8 volts. Variable dc voltage output 42 determines the amount of gain for preamplifier 54 by the amount that the voltage exceeds the reference voltage. The preamplifier achieves maximum gain when the voltage coupled through the cable is at its greatest level. For example, for a maximum level of 28.8 volts at line 34 typically results in a gain for a typical preamplifier of 27 db. At the minimum level of 18.8 volts for voltage 42 to establish a reference level of 16.8 volts, the typical preamplifier will have approximately a -10 db attenuation "gain". The preamplifier has the variable gain control feature to allow it to minimize third order intermodulation.

In operation of the blimp-carried electronics just described in conjunction with a received seismic data signal from a field detector on antenna 20, the circuit couples the received rf signal via P-I-N diode switch 56 to radio frequency preamplifier 54. P-I-N diode switch 56 is a well-known solid state receive/transmit switch. Following preamplification, the seismic data signal is coupled to the instrument room via rf coaxial cable 18 (18B in FIG. 2).

A transmit mode for the electronics carried by the blimp is achieved by supplying a ground potential from control switch 36 through coaxial cable 18. Although it is convenient to use a ground potential for this purpose, a dc potential not exceeding a low amplitude could be employed as well, if desired. The ground potential is coupled through decoupling network 40 to transmit control network 58, which connects the output potential of the battery through network 58 to modulator 60, transmitter 62 and P-I-N diode switch 56. When modulator 60 receives the 14-volt potential, it provides a suitable signal, such as a 1000 HZ signal, to transmitter 62. Transmitter 62 is a low power, narrow band, high frequency, frequency modulated transmitter. An example of operation would be at 1-watt power transmitting at 72.980 MHz. The fm rf energy from the transmitter is coupled through P-I-N diode switch 56 to antenna 20, the P-I-N diode switch being placed in the transmit mode by the application of the 14-volt potential via transmit control network 58. This fm radio frequency energy from antenna 20 commands the field detectors, as more fully explained in patent application Ser. No. 48,393. The detector transmissions are received by the antenna and are then coupled to the instrument room, as previously described.

When the ground or other low dc potential is removed from transmit control network 58 via control switch 36, a trickle charge can be supplied to battery 52, provided that there is an output from voltage regulator 48.

Although the operation of voice communications which is required to keep the operation of the central data station in contact with the personnel attending sources and detectors can be completely independent of the data gathering system described above, an audio channel or channels can be provided, if desired. In this event, an audio or intermediate frequency transceiver 38 would be provided in the ground equipment (FIG. 2) and would have its output coupled through control switch 36. Outgoing signals from transceiver 38 would be passed through control switch 36 and up cable 18A to be decoupled in decoupler 40 and provided on line 44 to band pass filter network 64. This voice channel would then be connected to modulator 60, as shown in FIG. 3.

Incoming voice communications would be received by P-I-N diode switch 56 and applied through preamplifier 54 to be applied on line 18B by filtering or otherwise after being passed by control switch 36.

The system just described advantageously permits the recording equipment and the visual drywrite camera that is relatively bulky, high-energy consumptive and the like to be placed in the ground station part of the central station, while the relatively lightweight antenna, transmitter, modulator, battery and preamplifier portion is located in the blimp station part of the central station. This relatively low-powered apparatus is powered by the blimp-carried battery, there being no cable losses in conjunction therewith. Were only the antenna located with the blimp and all other components located on the ground, there would be cable losses, requiring larger capacity electronics as well as batteries. As described, the following approximate weights apply: 6 pounds for the electronics, 2 pounds for the tethering gear, 1 pound for the rf coaxial cable. If the blimp carries 11 pounds with ease, there is a 2 pound safety factor.

Although particularly advantageous in operations where there are ground swells and rugged terrain, the system can be used to advantage on flat ground where a tall (e.g., 100 feet) telescoping, jack-up antenna would normally be employed from a central-station, land-based installation. Also, for a system normally employing an airplane as a central station, the use of blimp-carried electronics just described can be used as an alternate to replace an airplane-installed central station, or at least as a backup to be used when such an equipped airplane is down for repairs. The electronics carried by the blimp can be conveniently clipped on and off through simplified mounting connections, which makes it convenient to move the electronics package to another blimp in case the first one is damaged.

The instrument room is conveniently mounted on a base suitable for helicopter pickup and transporting. In normal weather, the blimp is merely winched downward and covered by a net or tarpaulin and secured to the ground station room. A long line can be used to lift and carry the assembly even without deflating the blimp first.

An active central gathering station has been described above, wherein at least some of the active components are included advantageously in the blimp apparatus. Alternatively, or supplementarily, it is possible to use a blimp as a passive reflector, when the blimp is appropriately painted or otherwise covered with a suitable reflective coating.

While a particular embodiment of the invention has been shown and described, it will be understood that the invention is not limited thereto, since many modifications may be made and will become apparent to those skilled in the art. For example, a blimp can be inflated and left in position for many days at a time, if desired. However, since seismic exploration is usually suspended overnight, it is preferable to winch in the blimp overnight to check it for normalcy, add helium if needed and relaunch the blimp the following day, even when the location is not to be changed.

What is claimed is:

1. In combination with a seismic gathering system employing
a plurality of field unit seismic detectors, each of the detectors including a receiver and a controllable rf transmitter, a predetermined received signal activating the transmitter at each of the detectors, and
a central data gathering station for transmitting predetermined signals to selectively controllably activate the transmitters at the field detectors and for receiving and recording the transmissions from the field detectors,
the improvement in a central gathering station comprising
ground station apparatus including
recording means for recording seismic data,
a power supply for supplying operating power to said recording means and including a variable dc voltage output,
switching means connected to the variable dc voltage output from said power supply and to said recording means,
an rf coaxial cable connected to said switching means, and
blimp station apparatus including
a tethered aerodynamically stabilized blimp,
rf radio receiver means carried by said blimp and including
decoupling means connected to said rf coaxial cable for separating rf signals from said variable dc voltage,
a preamplifier having a gain control connected to said decoupled variable dc output and having an rf output connected to said rf coaxial cable, and
antenna means for receiving field detector transmissions, said antenna means being coupled to said preamplifier for producing rf seismic data transmissions on said rf coaxial cable to said recording means.

2. The improvement in accordance with claim 1, and inlcuding
transmitter means carried by said blimp connected to said antenna means, and
transmit control means connected to said transmitter means and activated by a predetermined dc voltage from said ground station power supply, activation of said transmit control means causing said transmitter means to produce a predetermined signal transmission from said antenna for activating the transmitters at the detectors.

3. The improvement in accordance with claim 2, and including a modulator connected to said transmitter means and activated by said transmit control means, thereby producing a modulated predetermined signal transmission from said antenna.

4. The improvement in accordance with claim 3, wherein
said ground station apparatus includes an audio transmitter having an output coupled through said switching means to said decoupling means, and
said blimp station apparatus includes an audio band pass filter connected to decouple the audio frequency signal from said decoupling means and to apply it to said modulator connected to said transmitter means.

5. The improvement in accordance with claim 4, wherein said audio transmitter in said ground station apparatus includes a tone encoder for controlling shooting apparatus.

6. The improvement in accordance with claim 2, and including
a battery carried by said blimp connected to said transmit control means,
said transmit control means being activated by a ground potential from said ground station power supply to connect said battery to said transmission means for producing said predetermined signal transmission therefrom.

7. The improvement in accordance with claim 1, wherein said blimp station apparatus includes
a voltage regulator connected to the decoupled dc voltage output from said decoupling means for establishing a regulated dc voltage reference output when the decoupled dc voltage thereto exceeds a predetermined level, and
wherein said preamplifier is connected to said dc voltage reference output, the gain control of said preamplifier being determined by the amount the variable dc voltage exceeds the dc voltage reference.

8. The improvement in accordance with claim 7, and including
transmitter means carried by said blimp connected to said antenna means,
transmit control means connected to said transmitter means and activated by a predetermined dc voltage from said ground station power supply, activation of said transmit control means causing said transmitter means to produce a predetermined signal transmission from said antenna for activating the transmitters at the detectors,
a battery carried by said blimp connected to said transmit control means, said transmit control means being activated by a ground potential from said ground station power supply to connect said battery to said transmission means for producing said predetermined signal transmission therefrom, and wherein said voltage regulator is connectable to trickle charge said battery.

9. The improvement in accordance with claim 8, and including switch means connected between said voltage regulator and said battery, said switch means opening in the absence of a voltage output from said voltage regulator.

10. In combination with a seismic gathering system employing a plurality of field unit seismic detectors, each of the detectors including a receiver and a controllable rf transmitter, a predetermined received signal activating the transmitter at each of the detectors, and a central data gathering station for transmitting predetermined signals to selectively controllably activate the transmitter at the field detectors and for receiving and recording the transmissions from the field detectors, the improvement in a central gathering station comprising ground station apparatus including recording means for recording seismic data, a power supply for supplying operating power to said recording means and including a variable dc voltage output, switching means connected to the variable dc voltage output from said power supply and to said recording means, blimp station apparatus including a tethered aerodynamically stabilized blimp having a reflective surface.

rf radio receiver means including decoupling means connected to the output of said switching means for separating rf signals from said variable dc voltage, a preamplifier having a gain control connected to said decoupled variable dc output and having an rf output connected as an input to said switching means, and antenna means for receiving field detectors transmissions following reflection from the reflective surface of said blimp station apparatus, said antenna means being coupled to said preamplifier for producing rf seismic data transmissions to said recording means.

* * * * *